UNITED STATES PATENT OFFICE.

JOSEPH GESSNER, OF NEWARK, NEW JERSEY.

KINDLER FOR FIRE-WOOD.

1,114,602. Specification of Letters Patent. Patented Oct. 20, 1914.

No Drawing. Application filed November 16, 1910. Serial No. 592,649.

*To all whom it may concern:*

Be it known that I, JOSEPH GESSNER, a citizen of the United States, residing at Newark, in the county of Essex and State of New Jersey, have invented certain new and useful Improvements in Kindlers for Fire-Wood; and I do hereby declare the following to be a full, clear, and exact description of the invention, such as will enable others skilled in the art to which it appertains to make and use the same.

This invention has reference, generally, to improvements in kindlers for fire-wood used in stoves, kitchen-ranges, furnaces, and the like; and, the present invention relates, more particularly, to a novel composition of matter, made in the form of small cube-like or similar bodies, one or more of which are to be placed upon the wood used in a stove, kitchen-range, furnace, and the like and is easily and quickly ignited, causing the composition of matter to flow in its burning condition over the wood so as to readily set the same ablaze.

The present invention has for its principal object to provide a novel composition of matter of the general character hereinafter set forth and for the purposes above stated, which is non-explosive and is not dangerous to the person lighting the same.

The invention has for its further object to provide an easily combustible composition of matter which is readily ignited, melts and spreads itself as a burning mass over the wood. The said composition of matter consists of the following ingredients, combined in the proportions stated, viz:—Kerosene or petroleum, 6 pounds; stearin, 4.5 ounces; soluble glass or water glass, 3.5 ounces; resinous matter, 4.5 ounces; potash, 3.5 ounces.

While the above stated composition of matter is the preferred form, it will be understood, however, that the various proportion, by weight, of the several ingredients may be varied without departing from the scope and spirit of the present invention.

In producing the above stated composition of matter the following process or steps are employed: The several ingredients are thoroughly mixed in any suitable manner, the water glass being in solution and thereupon suitably heated in a suitably constructed vessel until a substantially thick and semi-plastic mass is obtained. This semi-plastic mass is thereupon run from this vessel into a pan-shaped receiver, of any suitable size, and provided with an open top, in which the mass is allowed to cool and solidify into a block of a soft and waxy consistency. This block is readily removed from said pan-like receptacle, and is thereupon cut into smaller and cube-like pieces of any suitable sizes, as may be necessary, according to the quantity of wood with which the fire-kindler is to be used. In its use, all that is necessary is to place one of these small cube-like pieces upon the top of the pile of wood which is to be set on fire, and then apply a lighted match to the said cube-like piece. This piece will immediately become ignited and will assume a liquid condition, flowing readily in a burning mass over the wood which takes fire very readily, on account of the burning kerosene or petroleum, as will be clearly evident.

By means of the herein-above described composition of matter, I have easily produced a highly inflammable substance for the purposes heretofore stated, which can be used with great safety, as there is produced a composition of matter which is not an explosive one, so that all danger to the person kindling the fire is entirely overcome.

Having thus described my present invention, what I claim is:

1. A composition of matter for fire-kindling purposes containing liquid hydro-carbon, stearin, soluble glass, said soluble glass being in solution, resinous matter, and potash all heated to form a thick and semi-plastic mass and cooled so as to provide a mass of a soft and waxy consistency.

2. A composition of matter for fire-kindling purposes, consisting of a mixture of kerosene, stearin, soluble glass, said soluble glass being in solution, resinous matter, and potash all heated to form a thick and semi-plastic mass and cooled so as to provide a mass of a soft and waxy consistency.

3. A composition of matter for fire-kindling purposes, consisting of a mixture of kerosene, 6 pounds, stearin, 4.5 ounces, soluble glass, 3.5 ounces, said soluble glass being in solution, resinous matter, 4.5 ounces, and potash, 3.5 ounces.

In testimony, that I claim the invention set forth above I have hereunto set my hand this 15th day of November 1910.

JOSEPH GESSNER.

Witnesses:
GEORGE D. RICHARDS,
FRED'K H. W. FRAENTZEL.